(12) United States Patent
Kosmatka et al.

(10) Patent No.: US 6,390,932 B1
(45) Date of Patent: May 21, 2002

(54) COMPLIANT POLYMER FACE GOLF CLUB HEAD

(75) Inventors: John B. Kosmatka, Encinitas; David L. Felker, Bonsall; Pijush Dewanjee, Oceanside, all of CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 09/551,284

(22) Filed: Apr. 18, 2000

(51) Int. Cl.⁷ .............................................. A63B 53/04
(52) U.S. Cl. ...................... 473/324; 473/326; 473/329; 473/349; 473/350
(58) Field of Search ................................ 473/324, 326, 473/329, 340, 342, 349, 350, 351

(56) References Cited

U.S. PATENT DOCUMENTS

| | | |
|---|---|---|
| 3,937,474 A | 2/1976 | Jepson et al. |
| 3,975,023 A | 8/1976 | Inamori |
| 3,989,248 A | 11/1976 | Campau |
| 4,252,262 A | 2/1981 | Igarashi |
| 4,326,716 A | 4/1982 | Lacoste |
| 4,398,965 A | 8/1983 | Campau |
| 4,498,672 A | 2/1985 | Bulla |
| 4,687,205 A | 8/1987 | Tominaga et al. |
| 4,824,110 A | 4/1989 | Kobayashi |
| 5,083,778 A * | 1/1992 | Douglass .................... 473/329 |
| 5,172,913 A | 12/1992 | Bouquet |
| 5,261,663 A | 11/1993 | Anderson |
| 5,261,664 A | 11/1993 | Anderson |
| 5,272,802 A | 12/1993 | Stites, III |
| 5,282,624 A | 2/1994 | Viste |
| 5,299,807 A | 4/1994 | Hutin |
| 5,310,185 A | 5/1994 | Viollaz et al. |
| 5,344,140 A | 9/1994 | Anderson |
| 5,346,217 A | 9/1994 | Tsuchiya et al. |
| 5,417,419 A | 5/1995 | Anderson et al. |
| 5,429,357 A | 7/1995 | Kobayashi |
| 5,431,396 A | 7/1995 | Shieh |
| 5,458,334 A | 10/1995 | Sheldon et al. |
| 5,460,371 A | 10/1995 | Takeda |
| 5,464,216 A | 11/1995 | Hoshi et al. |
| 5,485,998 A | 1/1996 | Kobayashi |
| 5,494,281 A | 2/1996 | Chen |
| 5,501,459 A | 3/1996 | Endo |
| 5,505,453 A | 4/1996 | Mack |
| 5,524,331 A | 6/1996 | Pond |
| 5,527,034 A | 6/1996 | Ashcraft et al. |
| 5,556,097 A | 9/1996 | Endo et al. |
| 5,628,697 A * | 5/1997 | Gamble ...................... 473/326 |
| 5,674,132 A * | 10/1997 | Fisher ..................... 473/342 X |
| 5,703,294 A | 12/1997 | McConnell et al. |
| 5,743,813 A | 4/1998 | Chen et al. |
| 5,776,011 A | 7/1998 | Su et al. |
| 5,788,584 A | 8/1998 | Parente et al. |
| 5,797,807 A | 8/1998 | Moore |
| 5,863,261 A | 1/1999 | Eggiman |
| 5,873,791 A | 2/1999 | Allen |
| 5,888,148 A | 3/1999 | Allen |
| 5,890,973 A * | 4/1999 | Gamble ...................... 473/326 |
| 5,935,020 A | 8/1999 | Stites et al. |
| 6,117,024 A * | 9/2000 | Dewanjee .................... 473/351 |
| 6,227,986 B1 * | 5/2001 | Fisher ........................ 473/342 |
| 6,238,302 B1 * | 5/2001 | Helmstetter et al. ......... 473/340 |
| 6,273,831 B1 * | 8/2001 | Dewanjee .................... 473/324 |
| 6,273,832 B1 * | 8/2001 | Helmstetter et al. ......... 473/324 |

FOREIGN PATENT DOCUMENTS

| | | |
|---|---|---|
| JP | 05116557 | 4/1993 |
| JP | 07216213 | 8/1995 |
| JP | 09235312 | 7/1997 |
| JP | 10028281 | 2/1998 |

* cited by examiner

Primary Examiner—Raleigh W. Chiu
(74) Attorney, Agent, or Firm—Michael A. Catania

(57) ABSTRACT

A golf club head having a face section with a polymer surface can provide a more efficient impact between a golf ball and the golf club head. By utilizing a polymer surface with desired material properties of stress, strain and damping levels, the face section will incur higher strain and strain rate levels than the golf ball. These lower internal stresses within the golf ball yield a more efficient impact with a golf club head.

28 Claims, 10 Drawing Sheets

COMPLIANT POLYMER FACE GOLF CLUB HEAD

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a golf club head. More specifically, the present invention relates to a polymer face section of a golf club head to reduce energy losses when impacting a golf ball.

2. Description of the Related Art

Technical innovation in the material, construction and performance of golf clubs has resulted in a variety of new products. The advent of metals as a structural material has largely replaced natural wood for wood-type golf club heads, and is but one example of this technical innovation resulting in a major change in the golf industry. In conjunction with such major changes are smaller scale refinements to likewise achieve dramatic results in golf club performance. For example, the metals comprising the structural elements of a golf club head have distinct requirements according to location in the golf club head. A sole or bottom section of the golf club head should be capable of withstanding high frictional forces for contacting the ground. A crown or top section should be lightweight to maintain a low center of gravity. A front or face of the golf club head should exhibit high strength and durability to withstand repeated impact with a golf ball. While various metals and composites are known for use in the face, several problems arise from the use of traditional face structure and materials. In addition, material interaction of the golf club head and the golf ball during impact is an important factor for performance of the golf club. In addition, material interaction of the golf club head and the golf ball during impact is an important factor for performance of the golf club.

The golf ball is typically composed of a core-shell arrangement with a thin polymer shell, or cover material such as ionomers, surrounding a rubber-like core. These polymeric materials exhibit compression and shear, stiffness and strength properties dependent upon strain (load), input frequency (time dependency of small linear strain), strain rate (time rate of loading including large nonlinear strains), and temperature. The compression and shear stiffness properties of polymeric materials are measured and classified in terms of a storage moduli (E', G') and a loss moduli (E'', G''), respectively. The storage moduli (E', G') represents the amount of compression and shear energy, respectively, stored during a complete loading cycle. For quasi-static loading, it is equivalent to the well known Young's modulus (E'=E) and shear modulus (G'=G =E/(2(1+v))), where (v) is the material Poisson ratio. For most polymers, the storage modulus increases significantly with strain, input frequency, and strain rate. For example, typical storage moduli for golf balls at low speed impacts, in the temperature range (50–100° F.), are $E'_{ball}$=450–6000 lb/in$^2$ and $G'_{ball}$= 150–2000 lb/in$^2$. During high-speed impacts, in the temperature range (50–100° F.), the typical storage are $E'_{ball}$= 9,000–50,000 lb/in$^2$ and $G'_{ball}$=3,000–16,500 lb/in$^2$. The low speed impact represents a putting stroke or a soft pitch shot, while the high-speed impact represents a golf swing with an iron-type or a wood-type golf club head.

The loss moduli (E'', G'') represents the amount of compression and shear energy, respectively, dissipated during a cycle. For most polymers, the loss moduli also increase significantly with strain, input frequency, and strain rate, but the rate of increase can be very different than the aforementioned storage moduli. Finally, the magnitude of the loss moduli at a given strain, strain rate, frequency, or temperature typically vary from 0.005–2.0 times that of the storage moduli.

A loss (or damping) factor ($\eta_E$, $\eta_G$) or loss angle ($\delta_E$, $\delta_G$) for compression and shear are commonly defined as the ratio of the corresponding moduli;

$$\eta_E = \mathrm{Tan}\delta_E = \frac{E''}{E'}, \eta_G = \mathrm{Tan}\delta_G = \frac{G''}{G'}.$$

These loss factors are an important measure of the damping capability (energy loss mechanisms) of the material. For most ball-type materials, ($\eta_E \equiv \eta_G$) and magnitudes fall in the range of 0.005 (low energy loss) to 2.0 (high-energy losses), where magnitudes clearly depend upon polymer composition, strain, input frequency, strain rate, and temperature. As a comparison, the loss factors (energy loss mechanisms) in a metallic face of a golf club head are on the order of 10–100 times smaller than that of a golf ball. For most elastomeric polymer materials operating below the glass transition region, the Poisson ratio is fairly constant with (v=0.4–0.5), while for stiff polymers acting at or above the glass transition region (v=0.3–0.33).

Thus, during impact of the golf ball with the golf club head a significant portion of impact energy is lost as a result of the large deformations (0.05 to 0.50 inches) and deformation rates of the high damped golf ball materials, as opposed to the small deformations of the low damped metallic club face (0.025 to 0.050 inches) materials. A larger portion of this impact energy is lost in the golf ball because the magnitude of the deformation, the deformation rate, and energy loss mechanisms is greater for the golf ball than the face of the golf club head.

Application of hard polymers to the face of the golf club head represents a traditional structure of natural wood golf club heads, where a hard insert material centrally located in the face of the golf club and requiring an exacting fit between two or more distinct elements. The hard insert must be manufactured to a close tolerance to fit within a recess in the face of the golf club, and high surface hardness is less efficient in transferring energy to the golf ball during impact with the golf club. A homogeneous face structure is simpler to manufacture but is limited to the inherent material properties of the single material comprising the face structure. The present invention achieves a more efficient energy transfer during impact while maintaining a simple construction.

BRIEF SUMMARY OF THE INVENTION

When a golf club head strikes a golf ball, large impact forces are produced that load the golf club head and the golf ball. Most of the energy is transferred from the golf club head to the golf ball; however, some energy is lost as a result of the impact. The present invention comprises an improved face structure for the golf club head to reduce impact energy losses, which could lead to greater efficiency in striking the golf ball. In a preferred embodiment the golf club head is a wood-type golf club head with a plurality of walls to define a hollow interior.

By allowing the golf club head to flex and "cradle" the golf ball during impact, the contact region as well as contact time between the golf ball and the face of the golf club head are increased, reducing the magnitude of the internal golf ball stresses as well as the rate of the stress build-up. This results in lower golf ball deformations and lower deformation rates to achieve lower energy losses in the golf ball during impact. The present invention accomplishes greater energy conserving impact by utilizing a specified polymer material layer on the face of the golf club head. During impact with the golf ball, the polymer layer compresses around the golf ball to enlarge the contact region and increase contact time of the golf ball, thus lowering the stresses and stress rate in the golf ball. Similarly, the polymer layer distributes the stresses to a backing structure in a more uniform manner. Also, the stress levels in the backing structure are significantly lower than the stresses of a similar metal golf club striking face without a polymer layer because there are no scorelines in the backing structure which serve to amplify the stresses. Thus the backing structure can be made thinner, and more flexible, than typical existing metal wood-type golf club heads. The more flexible backing structure coupled to the polymer layer can lead to even lower energy impact losses. The golf club head may be constructed from rigid material and still obtain the benefits of the present invention.

Coefficient of restitution (COR) is well known to those of ordinary skill in the art, and is defined as the ratio of the relative velocity of the golf ball to golf club head just after impact divided by the relative velocity of the golf head to golf ball just before impact. Expressed mathematically, the equation is outlined below:

$$COR = \frac{V_{2-Ball} - V_{2-Head}}{V_{1-Head} - V_{1-Ball}}$$

where $V_{2-Ball}$ is the velocity of the golf ball measured immediately after impact with the golf club head; $V_{1-Ball}$ is the velocity of the golf ball measured immediately before impact with the golf club head; $V_{1-Head}$ is the velocity of the golf club head measured immediately before impact with the golf ball; $V_{2-Head}$ is the velocity of the golf club head measured immediately after impact with the golf ball.

Polymer material chemistry and thickness determines important performance variables including durability, coefficient of restitution (COR) and material stress levels. In a preferred embodiment the polymer material should have a lower nominal (quasi-static) storage compression (E') and storage shear (G') moduli, lower nominal loss compression (E") and loss shear (G") moduli, and damping properties ($\eta_E$, $\eta_G$) than these same properties of the golf ball $E'_{ball}$, $G'_{ball}$, $E''_{ball}$, $G''_{ball}$ and ($\eta_E$, $\eta_G$)$_{ball}$ respectively. Thus the polymer layer on the face of the golf club head will deform around, or "cradle", the golf ball with lower energy loss mechanisms than the cover material of the golf ball. Since these polymer material storage and loss moduli significantly increase with golf club head impact speed, an important goal for the polymer material on the face of the golf club head is to have an effective lower storage compression and loss compression moduli (E', E") and storage shear and loss shear moduli (G', G") than the golf ball ($E'_{ball}$, $G'_{ball}$, $E''_{ball}$, $G''_{ball}$) at the higher loading rates and input frequency found in the high speed impact associated with the wood-type golf club head. These loading rates are typically 1000–5000 in/in/sec and the input frequency is typically 500–4000 cycles/sec.

Thus, polymer face materials that have higher storage and loss moduli than the golf ball at low load rates are also covered by the present invention, as long as the polymer face materials have lower effective storage and loss moduli than the golf ball at wood-type golf club head impact load rates. Ideally, the storage and loss moduli of the polymer face material would be lower than the golf ball properties and be strain, strain rate, and input frequency insensitive. Performance benefits can be obtained when the polymer face material has a storage and/or loss moduli limit of about twice the storage and/or loss moduli of the ball material. The polymer utilized in the face of the golf club head is much softer than a typical metallic face and the impact duration between the golf ball and the golf club head is increased.

One object of the present invention is to improve impact efficiency between a golf club head and the golf ball.

Another object is to incorporate a polymer material in the face section of a golf club head to perform as a compliant golf club face. Any number of rigid materials can be utilized in the manufacture of the golf club of the present invention to produce a compliant, or softer flexing performance, golf club face during impact with the golf ball.

A further object of the present invention is a wood-type golf club head having a polymer face material with a storage compression and storage shear modulus less than that of a golf ball at low loading rates.

Another object of the present invention is a wood-type golf club head having a polymer face material with a storage compression and storage shear modulus less than that of a golf ball at high loading rates.

Another object of the present invention is a wood-type golf club head having a polymer face material with a loss compression and loss shear modulus less than that of a golf ball at low loading rates.

Another object of the present invention is a wood-type golf club head having a polymer face material with a loss compression and storage shear modulus less than that of a golf ball at high loading rates.

Another object of the present invention is a wood-type golf club head having a polymer face material with a storage compression and storage shear modulus less than or equal to double the storage compression and storage shear moduli of a golf ball at low loading rates.

Another object of the present invention is a wood-type golf club head having a polymer face material with a storage compression and storage shear modulus less than or equal to double the storage compression and storage shear moduli of a golf ball at high loading rates.

Another object of the present invention is a wood-type golf club head having a polymer face material with a loss compression and loss shear modulus less than or equal to double the loss compression and loss shear moduli of a golf ball at low loading rates.

Another object of the present invention is a wood-type golf club head having a polymer face material with a loss compression and loss shear modulus less than or equal to double the loss compression and loss shear moduli of a golf ball at high loading rates.

Another object of the present invention is a wood-type golf club head having a face insert supported by a polymer material for flexing of the golf club face.

Another object of the present invention is to have a polymer face material composed of multiple polymer and/or metallic layers where the outer layers may be designed for improved durability and or spin-control.

Another object of the present invention is to have a nonhomogeneous polymer face material so that different material formulations may exist over the polymer face for the purpose of increasing impact velocity for center shots, but lower velocity or controlled spin for off-center shots.

Another object of the present invention is to have a golf club head with scorelines in a polymer face material.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Like numbers are used throughout the detailed description to designate corresponding parts of a golf club head of the present invention.

Figure 1:
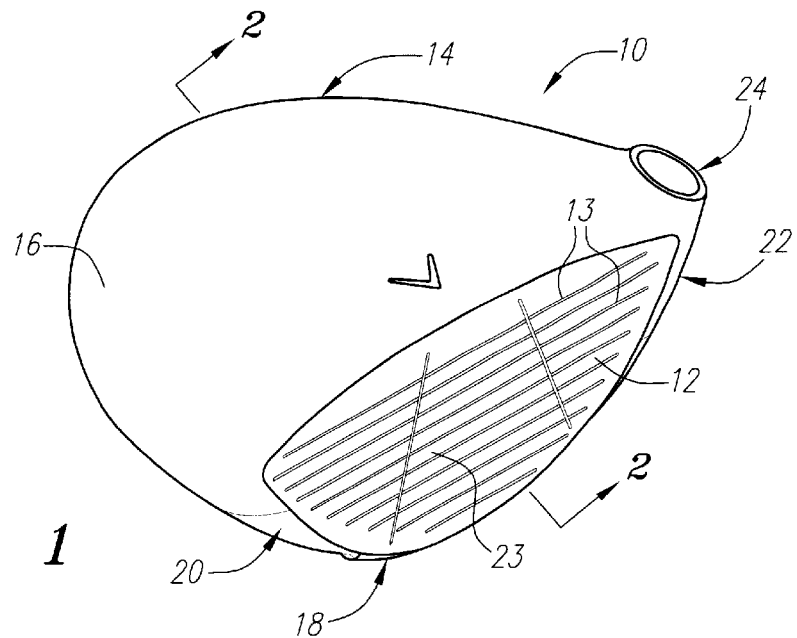
FIG. 1 is a perspective view of a golf club head of an embodiment of the present invention.

As shown in FIG. 1 a wood-type golf club head 10 comprises a face section 12, a plurality of scorelines 13, a rear section 14, a top section 16, a bottom section 18, a toe section 20, a heel section 22, a center section 23 and a hosel inlet 24 to accept a golf shaft (not shown). The golf club head 10 is a unitary structure which may be composed of two or more elements joined together to form the golf club head 10. Structural material for the golf club head 10 can be selected from metals and non-metals, with metals such as stainless steel and titanium being preferred embodiments. The face section 12 contains an impact surface for contacting a golf ball 32 (not shown).

Figure 2A:
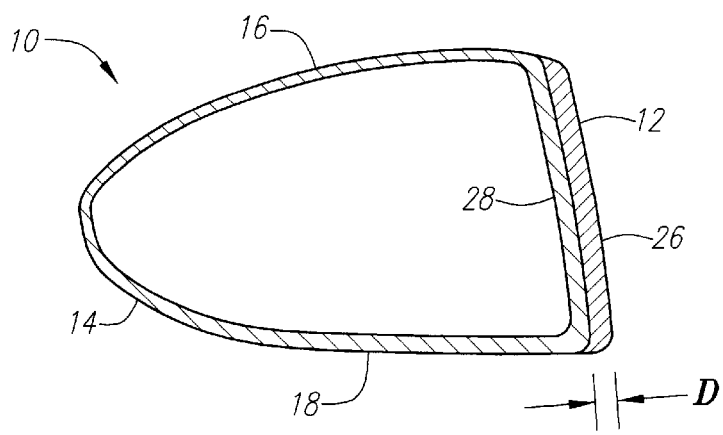
FIG. 2A is a cross-sectional toe view along lines II—II of FIG. 1, illustrating a polymer material on a front section of the golf club head of an embodiment of the present invention.
Figure 2B:
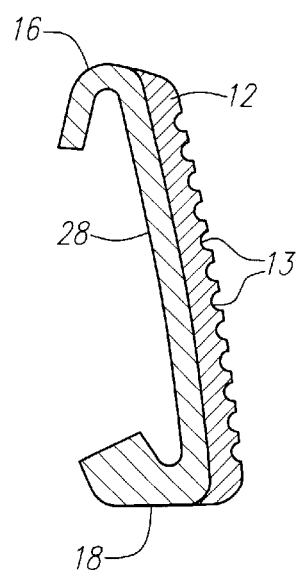
FIG. 2B is a cross-sectional toe view of an iron-type golf club head, illustrating a polymer material on a front section of a golf club head of an embodiment of the present invention.

FIG. 2A is an embodiment of the present invention where the face section 12 of the golf club head 10 contains a polymer 26 covering a backing structure 28. FIG. 2B is an iron-type golf club head of an embodiment of the present invention. In a preferred embodiment, the polymer 26 has material storage compression and loss compression moduli (E', E") and storage shear and loss shear moduli (G', G") properties lower than the golf ball material properties (E'$_{ball}$, G'$_{ball}$, E"$_{ball}$, G"$_{ball}$) at either low or high impact speeds. Low impact speeds are defined as the polymer 26 having a strain rate of less than 0.1 in/in/sec. High impact speeds are defined as the polymer 26 having a strain rate of less than 1000/in/in/sec. The E' E", G' and G" are measurements that quantify the dynamic performance properties of the polymer 26, and such measurement techniques are well-known in the art.

Materials for the polymer 26 include ionomers, polyamines, polyamides, polyetheramides, nylons, fluoroelastomers, polyurethanes, and butadiene rubbers. A preferred embodiment is a thermosetting or thermoplastic polyurethane. A preferred polyurethane is formed from the reaction of a para-phenylene diisocyanate ("PPDI") prepolymer with a curing agent. The PPDI prepolymer is formed by a reaction of PPDI with an ester polyol, a polyether polyol or a blend of more than one of these compounds. A preferred ester polyol compound is polycaprolactone. The PPDI prepolymer is then cured with an agent for a set period of time. The agent may be a diol (e.g. 1,4 butane diol, trimethylpropanol, etc.), a mixture of diols (e.g. 1,4 butane diol and ethylene glycol, or other suitable glycols), a hydroquinone, a mixture of hydroquinones, a triol, a mixture of triols, a diamine, a mixture of diamines, an oligomeric diamine, or a blend of some or all of these materials. The polyurethane may be either thermosetting or thermoplastic. The PPDI polymer is described in detail in co-pending patent application Ser. No. 09/295,635 entitled "Golf Ball with Polyurethane Cover", which has been assigned to the assignee of the present invention, and which is hereby incorporated by reference as if fully set forth herein. However, the present invention is not limited to the formulations disclosed in this co-pending application.

The polymer 26 forms the compliant surface on the golf club head 10 for impacting the golf ball 32. In other words, a relatively soft material, such as the polymer 26, can provide a more efficient energy transfer to the golf ball 32 by reducing the magnitude of the internal stress and the rate of build-up of that stress in the golf ball 32. A thickness "D" for the polymer 26 is not particularly limiting, and may range between 0.001 and 0.5 inches in addition to varying in depth across the face section 12. The polymer 26 may include the scorelines 13 on the face section 12. In addition, the face section 12 may be composed of multiple layers of polymers and/or metallics to improve durability and/or control spin of the golf ball 32. In an alternative embodiment, the face section 12 may be nonhomogeneous so that the polymer 26 formulation varies over the face section 12 to produce different levels of energy loss or spin control for different hit locations.

Figure 3A:
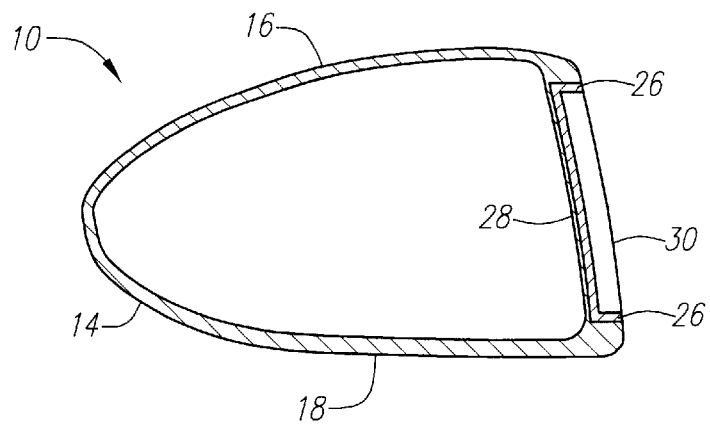
FIG. 3A is a cross-sectional toe view along lines II—II of FIG. 1, illustrating an alternative embodiment of the present invention with a front section of the golf club head having a face insert in conjunction with a polymer material.

FIG. 3A is an alternative embodiment of the present invention where an insert 30 is used in conjunction with the polymer 26 to provide a compliant face. In a preferred embodiment the polymer 26 has material storage compression and loss compression moduli (E', E") and storage shear and loss shear moduli (G', G") properties lower than the golf ball 32 material properties (E'$_{ball}$, G'$_{ball}$, E"$_{ball}$, G"$_{ball}$) at either low or high impact speeds. The insert 30 can be a metal or a non-metal material. The polymer 26 material may include scorelines 13 on the face section 12, be nonhomogeneous and alternatively composed of multiple layers.

Figure 3B:
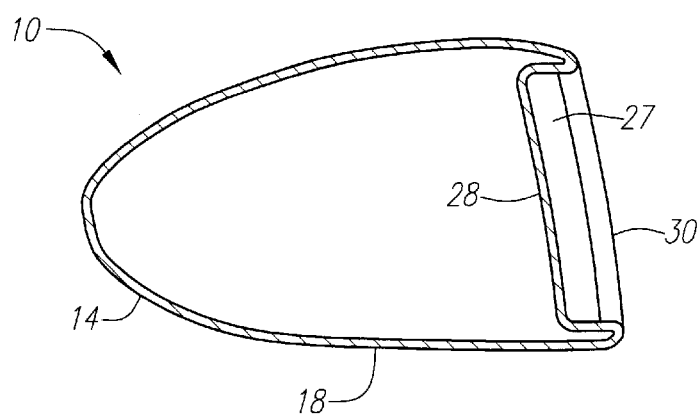
FIG. 3B is a cross-sectional toe view along lines II—II of FIG. 1, illustrating an alternative embodiment of the present invention having a front section of the golf club head with a face insert in conjunction with a liquid media.
Figure 3C:
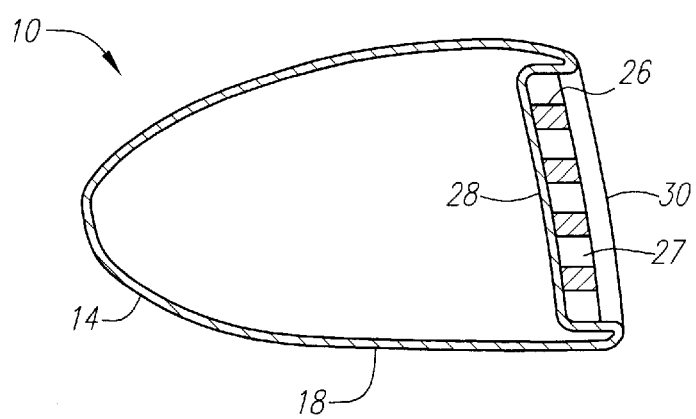
FIG. 3C is a cross-sectional toe view along lines II—II of FIG. 1, illustrating an alternative embodiment of the present invention having a front section of the golf club head with a face insert in conjunction with regions of a polymer material alternating with a liquid media.
Figure 3D:
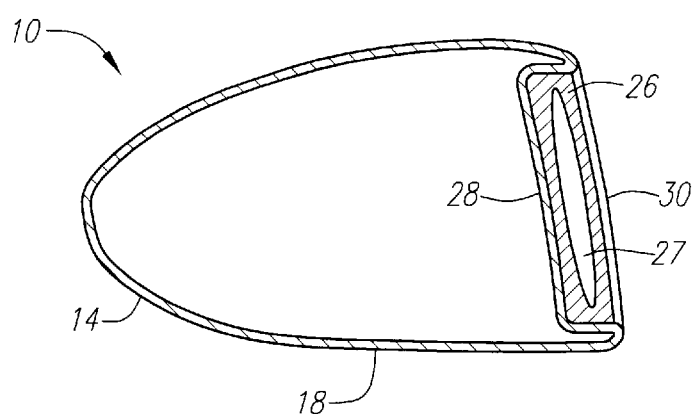
FIG. 3D is a cross-sectional toe view along lines II—II of FIG. 1, illustrating an alternative embodiment of the present invention with a front section having a polymer material, a liquid media and a face insert.

FIG. 3B is an alternative embodiment of the present invention where the insert 30 covers a liquid media 27 in the face section 12 of the golf club head 10. The liquid media 27 is an aqueous or non-aqueous liquid to help approximate polymer properties of low storage and loss moduli characteristics. Among the possible choices for the aqueous compositions for the liquid media 27 are: water, saline solution, starch solution or sugar solution; while possible choices for the non-aqueous compositions are low molecular weight oils and high molecular weight oils. FIGS. 3C and 3D represent possible choices for combining the polymer 26 material with the liquid media 27, arranged as alternating regions as in FIG. 3C or encapsulated region as in FIG. 3D.

Figure 4:
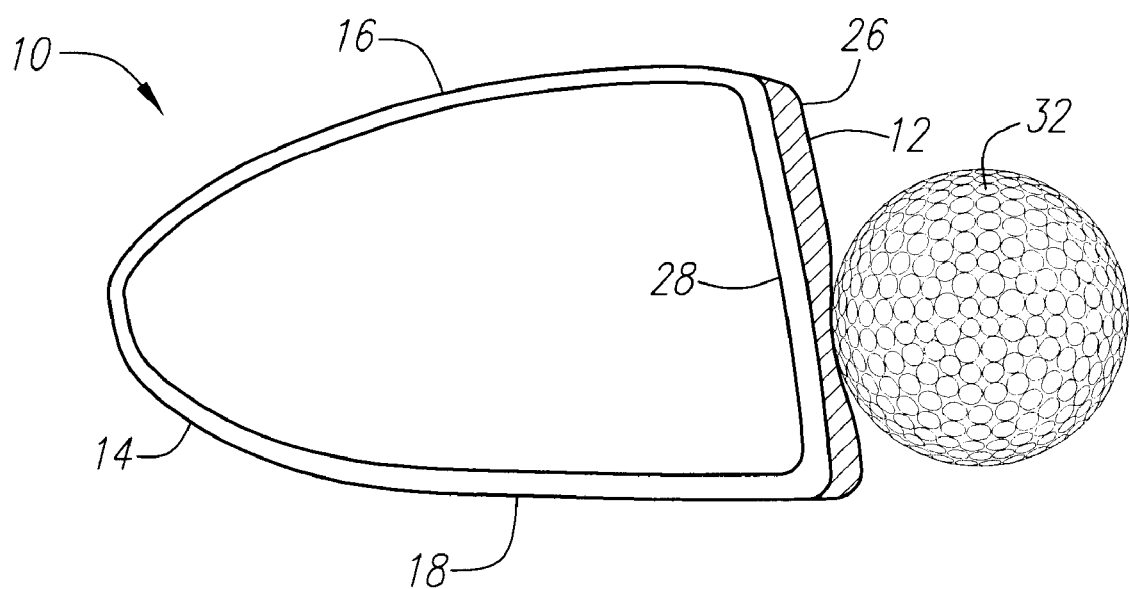
FIG. 4 is a toe view of the golf club head during initial impact with the golf ball.

FIG. 4 represents an initial impact where the polymer 26 is compressed by the golf ball 32. Rebound characteristics of the polymer 26 determine the COR up to a material compression defined limit, after which the combined deflection of the backing structure 28 and the polymer 26 dictates COR values.

Figure 5:
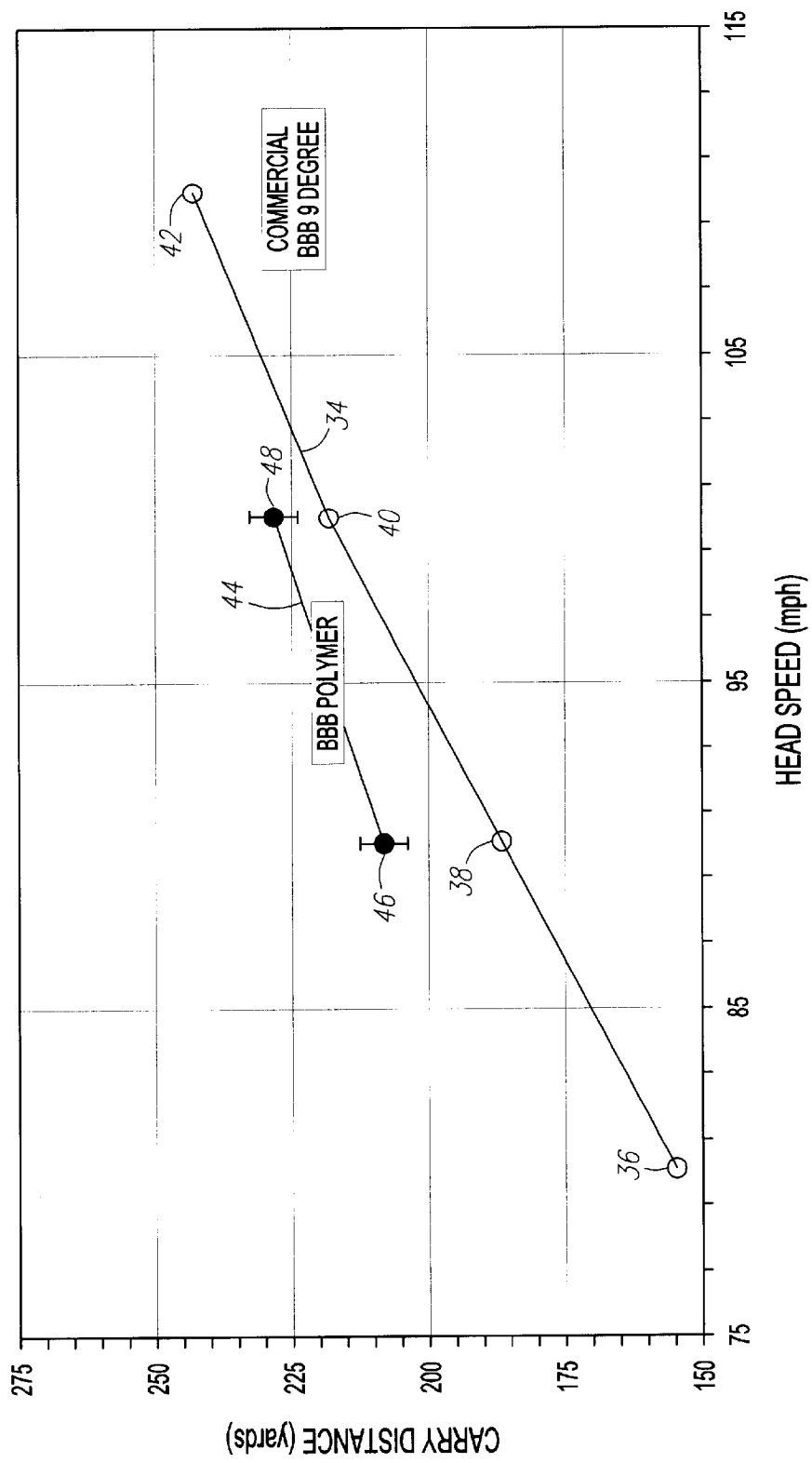
FIG. 5 is a graph of carry distance vs. golf club head speed for a standard product and the polymer face golf club of the present invention.

FIG. 5 is a graph of carry distance, also referred to as flight distance, of the golf ball after impact vs. speed of the golf club head during golf ball impact for a 9° Callaway Golf® Biggest Big Bertha® (hereinafter BBB) driver. Carry distance refers to the linear distance over the ground traversed by the airborne golf ball, and is well known by those of ordinary skill in the art. In this instance, polymer 26 is a para-phenylene diisocyanate having a uniform thickness ("D" in FIG. 2a) of 0.125 inches which covers the backing structure 28 with a thickness of 0.100 inches (a standard BBB has a face section 12 with a thickness of 0.135 inches). Because the weight combination of the polymer 26 and the backing structure 28 is less than the standard BBB, 8 grams of lead tape were added to the club head 10 to match the weight of the standard BBB.

A line 34 illustrates the linear relationship between carry distance and speed of the club head for impact speeds of 80, 90, 100 and 110 miles per hour (mph), designated 36, 38, 40 and 42 respectively. By comparison, line 44 illustrates the same BBB driver containing the polymer 26 on the face section 12, with impact speeds of 90 and 100 mph, designated 46 and 48 respectively. Increased carry distance resulting from the use of the golf club head 10 of the present invention is more dramatic at the slower head speed of 46 than that of 48.

Figure 6:
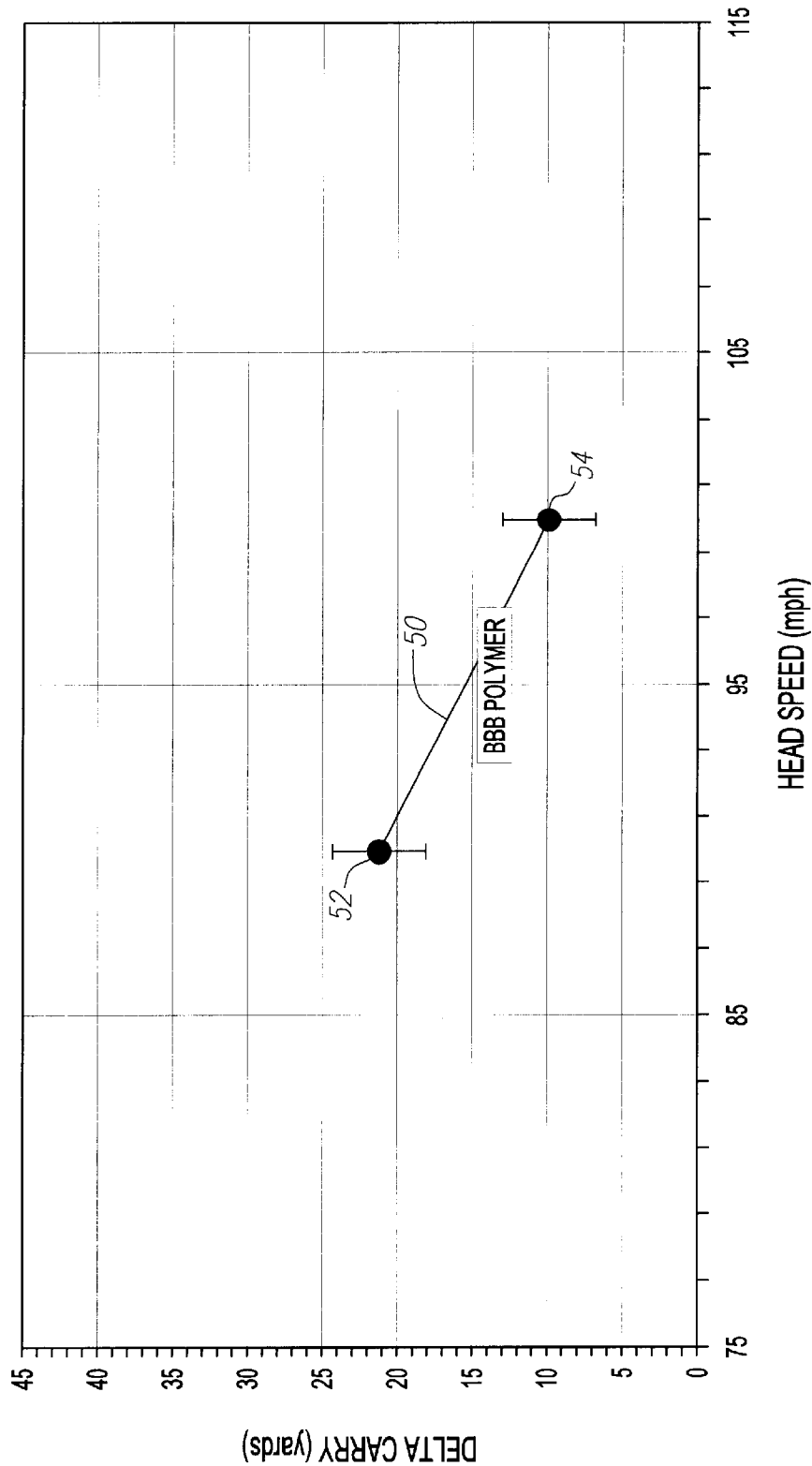
FIG. 6 is a graph of carry distance increase vs. golf club head speed for the polymer face golf club of the present invention.

This speed dependent improvement is better illustrated in FIG. 6 where an increase (delta) in carry distance resulting from use of the golf club head 10 of the present invention is plotted vs. head speed of the golf club head. Note line 50 decreases with increasing head speed, carry distance at 90 mph is approximately double the carry distance at 100 mph, points 52 and 54 respectively.

Figure 7:
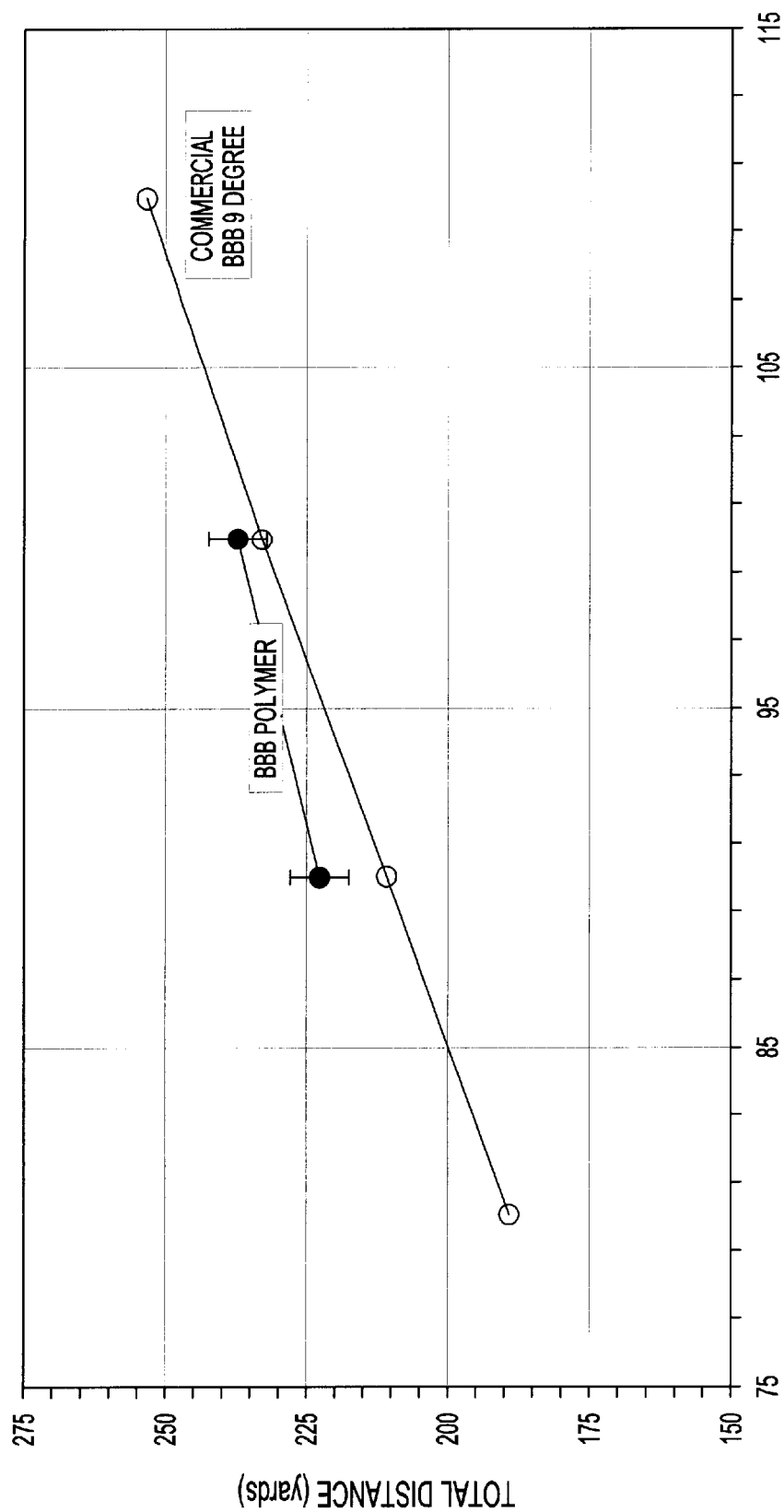
FIG. 7 is a graph of total distance vs. golf club head speed for a standard product and a polymer face golf club of the present invention.
Figure 8:
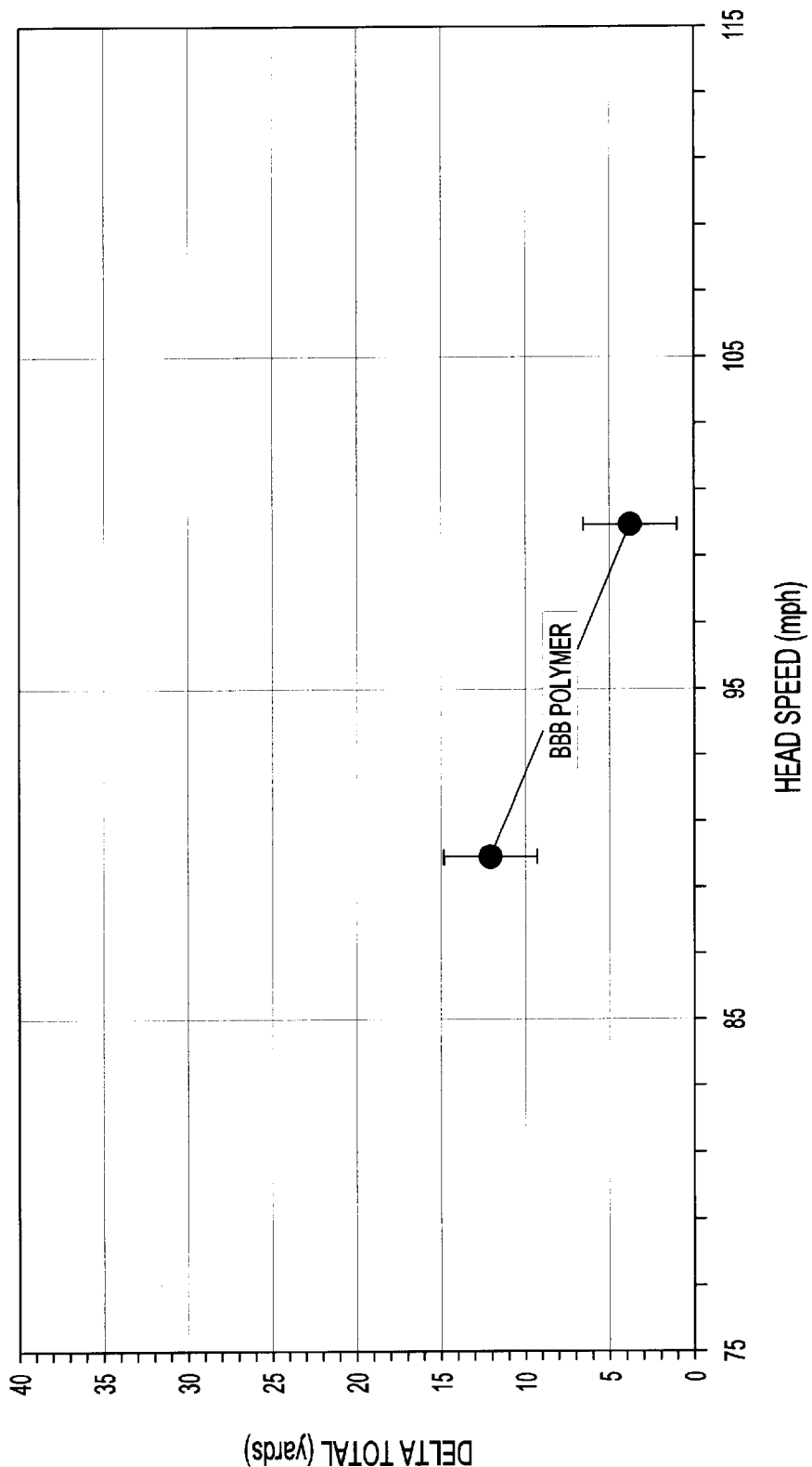
FIG. 8 is a graph of total distance increase vs. golf club head speed for the polymer face golf club of the present invention.

FIG. 7 represents total linear distance traveled by the golf ball while FIG. 8 plots the increase in total distance for the golf club head 10 containing the polymer 26 of the present invention. The total distance of FIGS. 7 and 8 includes the carry distance of the golf ball, as explained earlier, and distance the golf ball travels on the ground between ground contact and final resting position, and is well known by those of ordinary skill in the art. Graphical results of FIGS. 7 and 8 closely resemble FIGS. 5 and 6 although ground and turf conditions can have a large impact on the post airborne portion of total distance.

Figure 9:
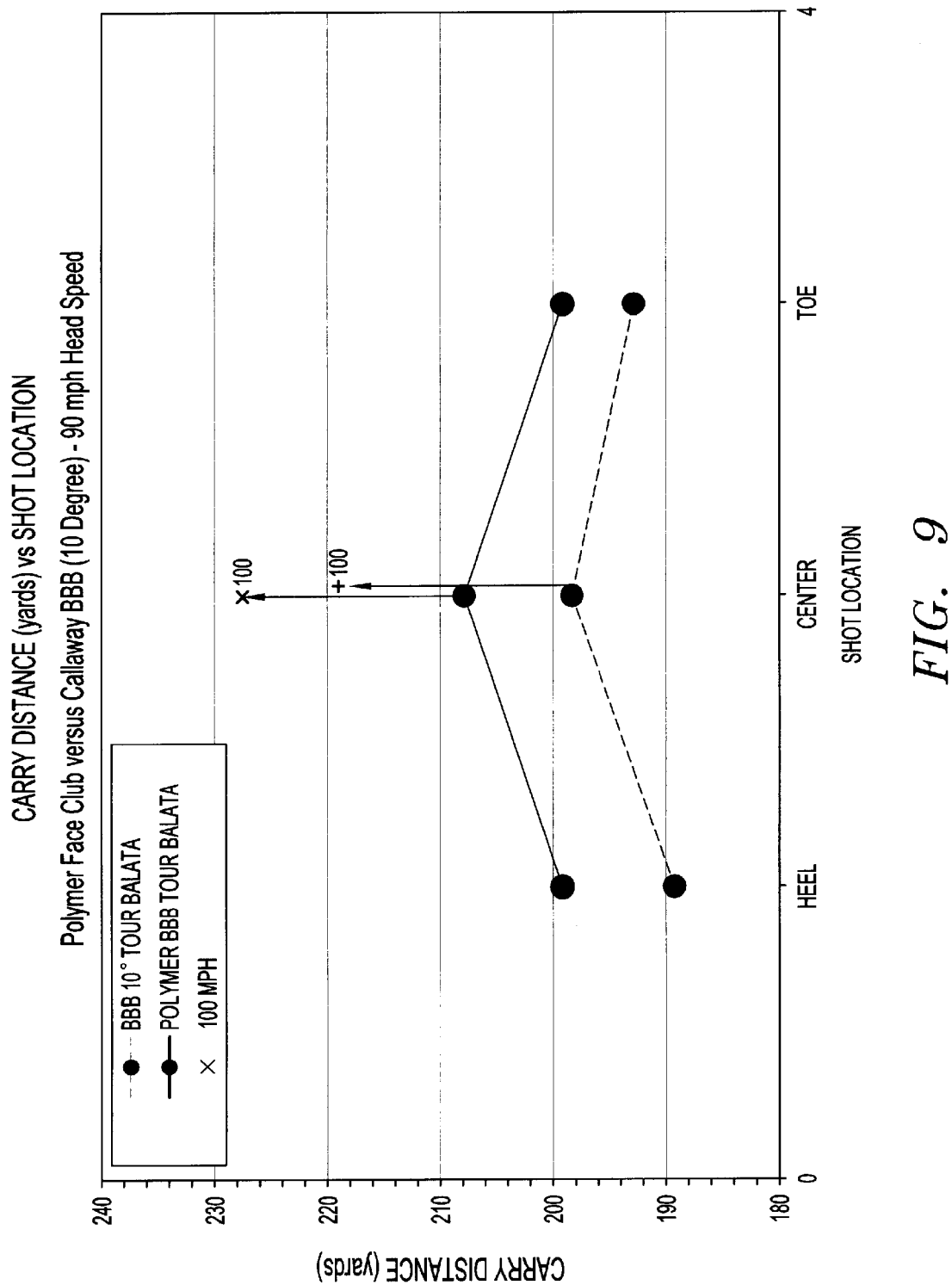
FIG. 9 is a graph of carry distance vs. shot location for a standard product and a polymer face golf club of the present invention.
Figure 10:
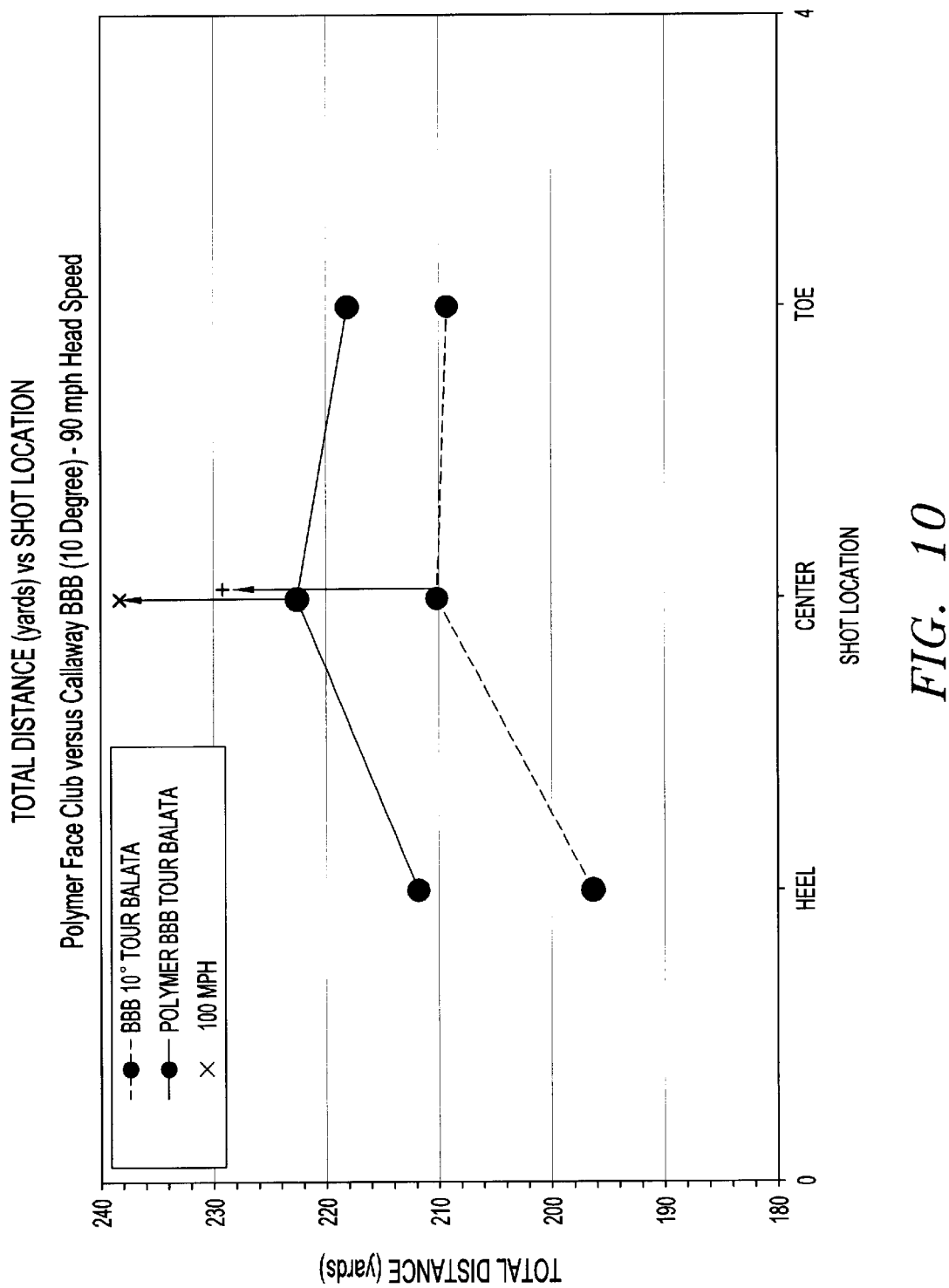
FIG. 10 is a graph of total distance vs. shot location for a standard product and a polymer face golf club of the present invention.

FIGS. 9 and 10 represent carry and total distance, respectively, for a 10° BBB driver at 90 mph head impact speed for the heel section 22, the center section 23 and the toe section 20 hit locations on the face section 12. Note that the heel, center and toe section hit locations, 22, 23 and 20 respectively, exhibit an increased carry distance for the golf club head 10 of the present invention. The center section 20 hit location, at 100 mph club head speed, likewise exhibit an advantage in carry distance for the golf club head 10 of the present invention.

Figure 11:
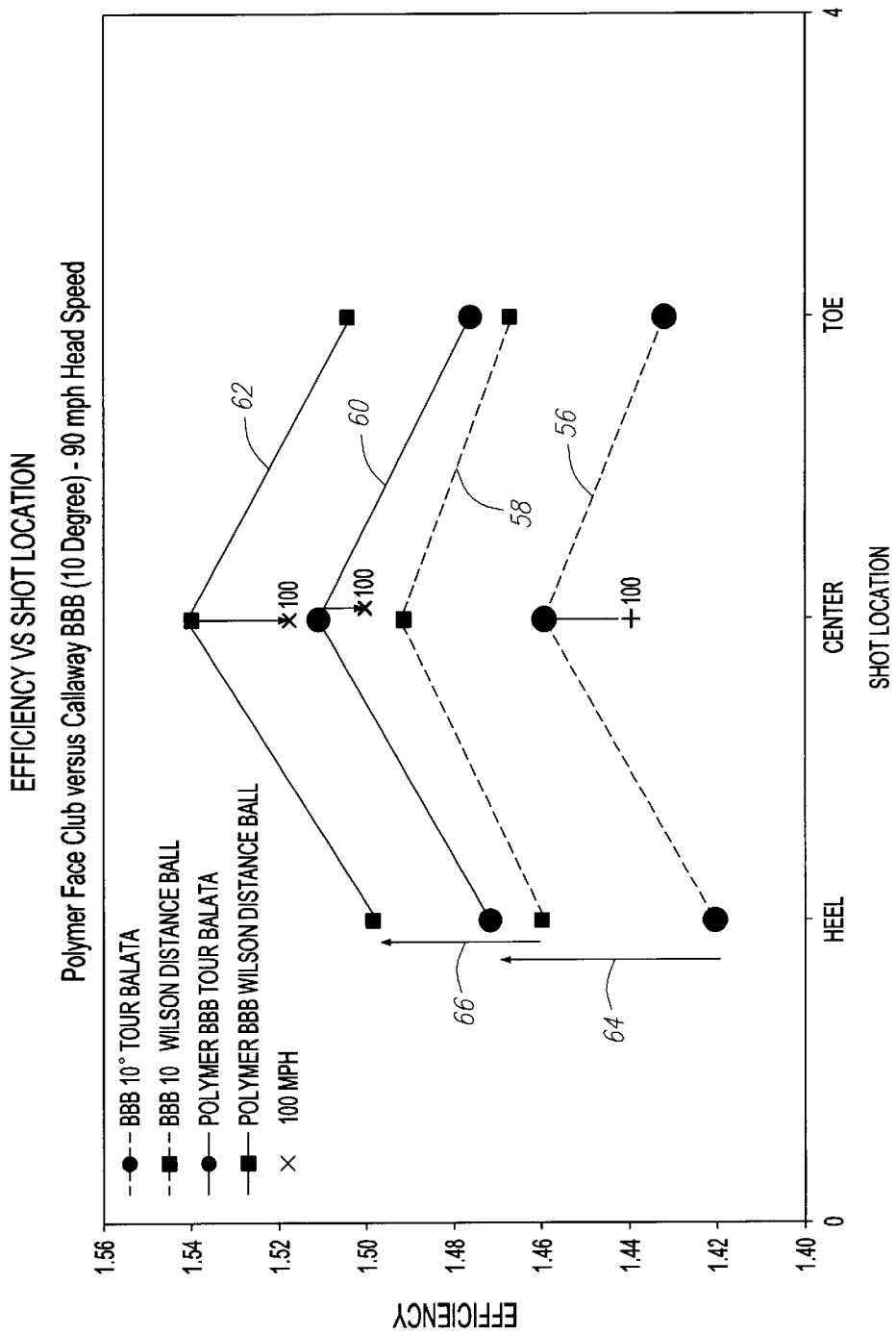
FIG. 11 is a graph of impact efficiency vs. shot location for a standard product and a polymer face golf club of the present invention.

FIG. 11 is a graph of impact efficiency of the golf club head with the golf ball vs. impact location on the golf club head for a 10° BBB driver. Impact efficiency ($\epsilon$) is a truncated version of the COR equation cited earlier, where ($\epsilon$) is expressed mathematically as:

$$\varepsilon = \frac{V_{2\,ball}}{V_{1\,club\,head}}$$

where $V_{2\,ball}$ is the velocity of the golf ball measured immediately after impact with the golf club head and $V_{1\,club\,head}$ is the velocity of the golf club head measured immediately before impact with the golf ball. Trace 56 represents impact efficiency of a standard BBB at 90 mph with a Titleist® Tour Balata golf ball when impact occurs in the heel section 22, the center section 23 and the toe section 20 of the face section 12. Trace 60 represents the same BBB containing the polymer 26 of the present invention with increased efficiency for the heel, center and toe section, 22, 23 and 20 respectively, hit locations. Trace 58 represents impact efficiency of a standard BBB at 90 mph with a Wilson® Distance golf ball when impact occurs in the heel section 22, the center section 23 and the toe section 20 of the face section 12. Trace 62 represents the same BBB containing the polymer 26 of the present invention with an increased efficiency for the heel, center and toe section, 22, 23 and 20 respectively, hit locations. Arrow 64 represents magnitude of efficiency increase of the golf club head 10 of the present invention for the heel section 22 hit location using a Titleist® Tour Balata golf ball; while arrow 66 represents magnitude of efficiency increase of the golf club head 10 of the present invention for the heel section 22 hit location using a Wilson® Distance golf ball. Similar efficiency increases are observed for the center section 23 and the toe section 20 hit locations. Note that efficiency is dependent upon club head impact speed, and decreases for both standard and polymer coated golf club heads at 100 mph but still maintains an efficiency advantage for the golf club head 10 of the present invention.

The polymer 26 can be manufactured separately from the golf club head 10 and attached using adhesives and/or mechanical fasteners. Other alternatives include casting, molding or spraying the polymer 26 onto new or existing golf club heads.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A golf club head for impacting a golf ball, the golf club head comprising:
   a face section having a polymer surface, wherein
      the polymer surface has a storage compression modulus of less than 6000 lb/in$^2$, at 70° F., when impacting the golf ball to produce a strain rate of less than 0.1 in/in/sec.

2. The golf club head of claim 1 wherein the polymer surface has a storage shear modulus of less than 2000 lb/in$^2$, at 70° F., when impacting the golf ball to produce a strain rate of less than 0.1 in/in/sec.

3. The golf club head of claim 2 wherein the polymer surface is selected from the group consisting of ionomers, polyamines, polyamides, polyetheramides, nylons, fluoroelastomers, polyurethanes, polybutadiene rubbers, and copolymers thereof.

4. The golf club head of claim 3 wherein the polyurethane comprises para-phenylene diisocyanate.

5. The golf club head of claim 2 wherein the golf club head is a wood golf club head.

6. The golf club head of claim 2 wherein the golf club head is an iron golf club head.

7. A golf club head for impacting a golf ball, the golf club head comprising:
   a face section having a polymer surface, wherein
      the polymer surface has a storage compression modulus of less than 50,000 lb/in$^2$, at 70° F., when impacting the golf ball to produce a strain rate of less than 1000 in/in/sec.

8. The golf club head of claim 7 wherein the polymer coating has a storage shear modulus of less than 16,500 lb/in$^2$, at 70° F., when impacting the golf ball to produce a strain rate greater than 1000 in/in/sec.

9. The golf club head of claim 8 wherein the polymer surface is selected from the group consisting of ionomers, polyamines, polyamides, polyetheramides, nylons, fluoroelastomers, polyurethanes, polybutadiene rubbers, and copolymers thereof.

10. The golf club head of claim 8 wherein the golf club head is a wood golf club head.

11. The golf club head of claim 8 wherein the golf club head is an iron golf club head.

12. The golf club head of claim 10 wherein the polymer surface has a first layer of a first material and a second layer of a second material where the first material is distinct from the second material.

13. The golf club head of claim 10 wherein the polymer surface is nonhomogeneous.

14. The golf club head of claim 10 wherein the storage compression modulus is a first modulus and a storage compression modulus of the golf ball is a second modulus, where the first modulus, at 70° F., is less than twice the second modulus, at 70° F., when impacting the golf ball so the polymer surface has a strain rate greater than 1000 in/in/sec.

15. The golf club head of claim 10 wherein the storage shear modulus is a third modulus and a storage shear modulus of the golf ball is a fourth modulus, where the third modulus, at 70° F., is less than twice the fourth modulus, at 70° F., when impacting the golf ball so the polymer surface has a strain rate greater than 1000 in/in/sec.

16. The golf club head of claim 10 wherein the polymer surface has a loss compression modulus as a fifth modulus and a loss compression modulus of the golf ball is a sixth modulus, where the fifth modulus, at 70° F., is less than twice the sixth modulus, at 70° F., when impacting the golf ball so the polymer surface has a strain rate greater than 1000 in/in/sec.

17. The golf club head of claim 10 wherein the polymer surface has a loss shear modulus as a seventh modulus and a loss shear modulus of the golf ball is an eighth modulus, where the seventh modulus, at 70° F., is less than twice the eighth modulus, at 70° F., when impacting the golf ball so the polymer surface has a strain rate greater than 1000 in/in/sec.

18. A golf club head for impacting a golf ball, the golf club head comprising:
   a front wall, a rear wall, a top wall, a bottom wall, a toe wall and a heel wall; and
   the front wall having a backing structure, a polymer layer and an insert; wherein
      the polymer layer has a storage compression modulus of less than 6000 lb/in$^2$, at 70° F., when impacting the golf ball to produce a strain rate of less than 0.1 in/in/sec.

19. The golf club head of claim 18 wherein the polymer layer has a storage sheer modulus of less than 2000 lb/in$^2$, at 70° F., when impacting the golf ball to produce a strain rate of less than 0.1 in/in/sec.

20. The golf club head of claim 19 wherein the polymer layer is selected from the group consisting of ionomers, polyamines, polyamides, polyetheramides, nylons, fluoroelastomers, polyurethanes, polybutadiene rubbers, and copolymers thereof.

21. The golf club head of claim 19 wherein the golf club head is a wood golf club head.

22. The golf club head of claim 19 wherein the golf club head is an iron golf club head.

23. A golf club head for impacting a golf ball, the golf club head comprising:
   a front wall, a rear wall, a top wall, a bottom wall, a toe wall and a heel wall; and
   the front wall having a backing structure, a polymer layer and an insert;
   wherein the polymer layer has a storage compression modulus of less than 50,000 lb/in$^2$, at 70° F., when impacting the golf ball to produce a strain rate of greater than 1000 in/in/sec.

24. The golf club head of claim 23 wherein the polymer layer has an shear modulus of less than 16,500 lb/in$^2$, at 70° F., when impacting the golf ball to produce a strain rate of greater than 1000 in/in/sec.

25. The golf club head of claim 24 wherein the polymer layer is selected from the group consisting of ionomers, polyamines, polyamides, polyetheramides, nylons, fluoroelastomers, polyurethanes, polybutadiene rubbers, and copolymers thereof.

26. The golf club head of claim 24 wherein the golf club head is a wood golf club head.

27. The golf club head of claim 24 wherein the golf club head is an iron golf club head.

28. The golf club head of claim 25 further comprising a liquid media located rearward of the insert.

\* \* \* \* \*